United States Patent
Afsharian et al.

(10) Patent No.: US 11,463,014 B2
(45) Date of Patent: Oct. 4, 2022

(54) APPARATUS AND METHOD OF OPERATING MATRIX CONVERTER-BASED RECTIFIER WHEN ONE PHASE IS DISCONNECTED OR IS SHORT-CIRCUITED

(71) Applicant: Murata Manufacturing Co., Ltd., Nagaokakyo (JP)

(72) Inventors: Jahangir Afsharian, Markham (CA); Bing Gong, Markham (CA); Dewei Xu, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 6 days.

(21) Appl. No.: 16/498,609

(22) PCT Filed: Mar. 29, 2018

(86) PCT No.: PCT/US2018/025004
§ 371 (c)(1),
(2) Date: Sep. 27, 2019

(87) PCT Pub. No.: WO2018/183595
PCT Pub. Date: Oct. 4, 2018

(65) Prior Publication Data
US 2021/0111637 A1 Apr. 15, 2021

Related U.S. Application Data

(60) Provisional application No. 62/479,552, filed on Mar. 31, 2017.

(51) Int. Cl.
*H02M 7/217* (2006.01)
*H02M 1/32* (2007.01)

(52) U.S. Cl.
CPC ............ *H02M 7/217* (2013.01); *H02M 1/32* (2013.01); *H02M 1/325* (2021.05)

(58) Field of Classification Search
CPC ............ H02M 1/4258; H02M 1/4233; H02M 1/4216; H02M 7/02; H02M 7/04;
(Continued)

(56) References Cited

U.S. PATENT DOCUMENTS

| | | | | |
|---|---|---|---|---|
| 5,329,439 A | * | 7/1994 | Borojevic | H02M 5/271 363/87 |
| 5,367,448 A | * | 11/1994 | Carroll | H02M 3/28 323/207 |

(Continued)

FOREIGN PATENT DOCUMENTS

| | | |
|---|---|---|
| CN | 105576994 A | 5/2016 |
| JP | 2006-296108 A | 10/2006 |

(Continued)

OTHER PUBLICATIONS

Official Communication issued in International Patent Application No. PCT/US2018/025004, dated Jul. 5, 2018.
(Continued)

*Primary Examiner* — Gustavo A Rosario-Benitez
(74) *Attorney, Agent, or Firm* — Keating & Bennett, LLP

(57) ABSTRACT

A power supply circuit includes a matrix converter that converts a first to third input alternating current (AC) phases into a single primary phase, a transformer including a primary side electrically connected to the single primary phase, a rectifier electrically connected to a secondary side of the transformer, and an output voltage terminal electrically connected to the rectifier. The matrix converter includes first through sixth bi-directional switch pairs, and each of the first through sixth bi-directional switch pairs includes first and second uni-directional switches. When the third input AC phase is disconnected or short circuited, the second and the fifth bi-directional switch pairs are turned off, and, in each of the first, third, fourth, and sixth bi-directional switch pairs, one of the first and second uni-directional (Continued)

switches are turned on and the other of the second and first uni-directional switches are operated as a full-bridge phase-shifted converter.

17 Claims, 7 Drawing Sheets

(58) Field of Classification Search
CPC .......... H02M 7/66; H02M 7/68; H02M 7/757; H02M 7/797; H02M 2001/325; H02M 1/32; H02M 7/217; H02M 7/219; H02M 7/162; H02M 2007/2195
See application file for complete search history.

(56) References Cited

U.S. PATENT DOCUMENTS

| | | | | |
|---|---|---|---|---|
| 6,058,028 | A * | 5/2000 | Czerwinski | H02M 5/297 318/811 |
| 6,166,930 | A * | 12/2000 | Czerwinski | H02M 5/271 318/811 |
| 9,197,137 | B2 * | 11/2015 | Saito | H02M 7/217 |
| 9,203,325 | B2 * | 12/2015 | Saito | H02M 7/217 |
| 9,973,107 | B2 * | 5/2018 | Cerqueira Pinto Bezerra Varajao | H02J 3/32 |
| 2005/0207197 | A1 | 9/2005 | Chou et al. | |
| 2006/0262576 | A1 * | 11/2006 | Przybyla | H02M 7/219 363/21.02 |
| 2011/0292697 | A1 * | 12/2011 | Alexander | H02M 5/458 363/37 |
| 2012/0217749 | A1 * | 8/2012 | Castelli Dezza | H02P 9/305 290/44 |
| 2015/0124505 | A1 * | 5/2015 | Wang | H02M 1/4216 363/126 |
| 2017/0310237 | A1 * | 10/2017 | Uda | H02M 7/217 |
| 2019/0273445 | A1 * | 9/2019 | Cho | H02M 7/12 |

FOREIGN PATENT DOCUMENTS

| | | |
|---|---|---|
| JP | 2010-252563 A | 11/2010 |
| WO | 2016/024223 A1 | 2/2016 |
| WO | 2017/049250 A1 | 3/2017 |

OTHER PUBLICATIONS

Official Communication issued in corresponding Chinese Patent Application No. 201880022604.2, dated Nov. 23, 2020.

Kwak et al., "Fault-Tolerant Topologies and Switching Function Algorithms for Three-Phase Matrix Converter based AC Motor Drives Against Open and Short Phase Failures", IEEE, Dec. 31, 2007, pp. 886-891.

* cited by examiner

APPARATUS AND METHOD OF OPERATING MATRIX CONVERTER-BASED RECTIFIER WHEN ONE PHASE IS DISCONNECTED OR IS SHORT-CIRCUITED

CROSS REFERENCE TO RELATED APPLICATIONS

This application claims the benefit of U.S. Provisional Patent Application No. 62/479,552 filed on Mar. 31, 2017. The entire contents of this application are hereby incorporated herein by reference.

BACKGROUND OF THE INVENTION

1. Field of the Invention

The present invention relates to matrix converters. More specifically, the present invention relates to operation of a multi-phase matrix rectifier when one input phase of the matrix rectifier is disconnected from a source or is short-circuited to the ground of the source.

2. Description of the Related Art

Generally, the power supplies for telecom and high-voltage direct current (HVDC) systems use a standard two-stage approach. The two stages include a front-end power-factor-correction (PFC) rectifier followed by an isolated direct-current-to-direct current (DC-DC) converter. For a three phase input, however, single-stage isolated matrix-type rectifiers are favorable in terms of high power density and high efficiency. Typically, single-stage isolated matrix-type rectifiers can be provided with a 3-phase-to-1-phase matrix converter that directly converts the mains frequency of the input AC voltage into a high-frequency AC voltage which is supplied to a high-frequency isolation transformer with a secondary voltage that is then rectified to the desired DC output voltage. The design of the matrix rectifier can be challenging because both PFC and isolated DC-DC conversion must be performed simultaneously over the entire load and input-line voltage ranges.

With a matrix rectifier, it is difficult to maintain the output voltage and to deliver continuous power when one of the three input phases is disconnected or is short circuited-shorted to the ground of the source) because of a lack of intermediate storage energy and a second stage DC-DC converter that is typically designed for low-tolerance output-voltage regulation.

SUMMARY OF THE INVENTION

Preferred embodiments of the present invention provide a matrix rectifier that, when one input phase is disconnected or is short circuited, is able to continuously operate a DC-DC converter, deliver about two thirds of total power to an output load, operate under a zero voltage switching (ZVS) condition due to phase-shifted operation, and/or maintain the output voltage.

A power supply circuit according to a preferred embodiment of the present invention includes a matrix converter that converts a first input alternating current (AC) phase, a second input AC phase, and a third AC input phase into a single primary phase; a transformer including a primary side electrically connected to the single primary phase; a rectifier electrically connected to a secondary side of the transformer; and an output voltage terminal electrically connected to the rectifier. The matrix converter includes first through sixth bi-directional switch pairs, and each of the first through sixth bi-directional switch pairs includes a first uni-directional switch and a second uni-directional switch. A first end of the first bi-directional switch pair, a first end of the third bi-directional switch pair, and a first end of the fifth bi-directional switch pair are connected together to provide a positive-voltage node. A first end of the second bi-directional switch pair, a first end of the fourth bi-directional switch pair, and a first end of the sixth bi-directional switch pair are connected together to provide a negative-voltage node. A second end of the first bi-directional switch pair and a second end of the fourth bi-directional switch pair are each connected to the first input AC phase, a second end of the third bi-directional switch pair and a second end of the sixth bi-directional switch pair are each connected to the second input AC phase, and a second end of the fifth bi-directional switch pair and a second end of the second bi-directional switch pair are each connected to the third input AC phase. When the third input AC phase is disconnected or short circuited, the second and the fifth bi-directional switch pairs are turned off, and, in each of the first, third, fourth, and sixth bi-directional switch pairs, one of the first and second uni-directional switches are turned on and the other of the second and first uni-directional switches are operated as a full-bridge phase-shifted converter.

Preferably, the first and second uni-directional switches of each of the first through sixth bi-directional switch pairs are electrically connected in series with each other. Preferably, the first and second uni-directional switches of each of the first through sixth bi-directional switch pairs are metal-oxide-semiconductor field-effect transistors.

Preferably, the first bi-directional switch pair and the sixth bi-directional switch pair are turned on with a same first on-time duration, and the third bi-directional switch pair and the fourth bi-directional switch pair are turned on with a same second on-time duration.

Preferably, during an interval when the first input AC phase is greater than the second input AC phase, the first uni-directional switch of the first bi-directional switch pair and the second uni-directional switch of the third bi-directional switch pair operate as complementary switches; and the second uni-directional switch of the fourth bi-directional switch pair and the first uni-directional switch of the sixth bi-directional switch pair operate as complementary switches.

Preferably, during an interval when the first input AC phase is greater than the second input AC phase, the second uni-directional switch of the first bi-directional switch pair, the first uni-directional switch of the third bi-directional switch pair, the first uni-directional switch of the fourth bi-directional switch pair, and the second uni-directional switch of the sixth bi-directional switch pair are all turned on.

Preferably, during an interval when the first input AC phase is greater than the second input AC phase, the second uni-directional switch of the first bi-directional switch pair, the first uni-directional switch of the third bi-directional switch pair, the first uni-directional switch of the fourth bi-directional switch pair, and the second uni-directional switch of the sixth bi-directional switch pair are controlled to provide synchronous rectification.

Preferably, during an interval when the first input AC phase is less than the second input AC phase, the second uni-directional switch of the first bi-directional switch pair and the first uni-directional switch of the third bi-directional switch pair operate as complementary switches, and the first uni-directional switch of the fourth bi-directional switch pair and the second uni-directional switch of the sixth bi-directional switch pair operate as complementary switches.

Preferably, during an interval when the first input AC phase is less than the second input AC phase, the first uni-directional switch of the first bi-directional switch pair, the second uni-directional switch of the third bi-directional switch pair, the second uni-directional switch of the fourth bi-directional switch pair, and the first uni-directional switch of the sixth bi-directional switch pair are all turned on.

Preferably, during an interval when the first input AC phase is less than the second input AC phase, the first uni-directional switch of the first bi-directional switch pair, the second uni-directional switch of the third bi-directional switch pair, the second uni-directional switch of the fourth bi-directional switch pair, and the first uni-directional switch of the sixth bi-directional switch pair are controlled to provide synchronous rectification.

Preferably, the first through sixth bi-directional switch pairs are turned on and off to regulate an output voltage level of the output voltage terminal. Preferably, the power supply circuit includes a controller that is a microcontroller, processor, field-programmable gate array, or a complex programmable logic device.

Preferably, the matrix converter is a buck-type converter.

Preferably, the rectifier includes four diodes arranged in a bridge.

Preferably, the power supply circuit includes an output filter electrically connected to an output of the rectifier. Preferably, the output filter includes an output inductor and an output capacitor.

The power supply circuit ay include an input filter electrically connected to each of the first, second, and third input AC phases The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Figure 1:
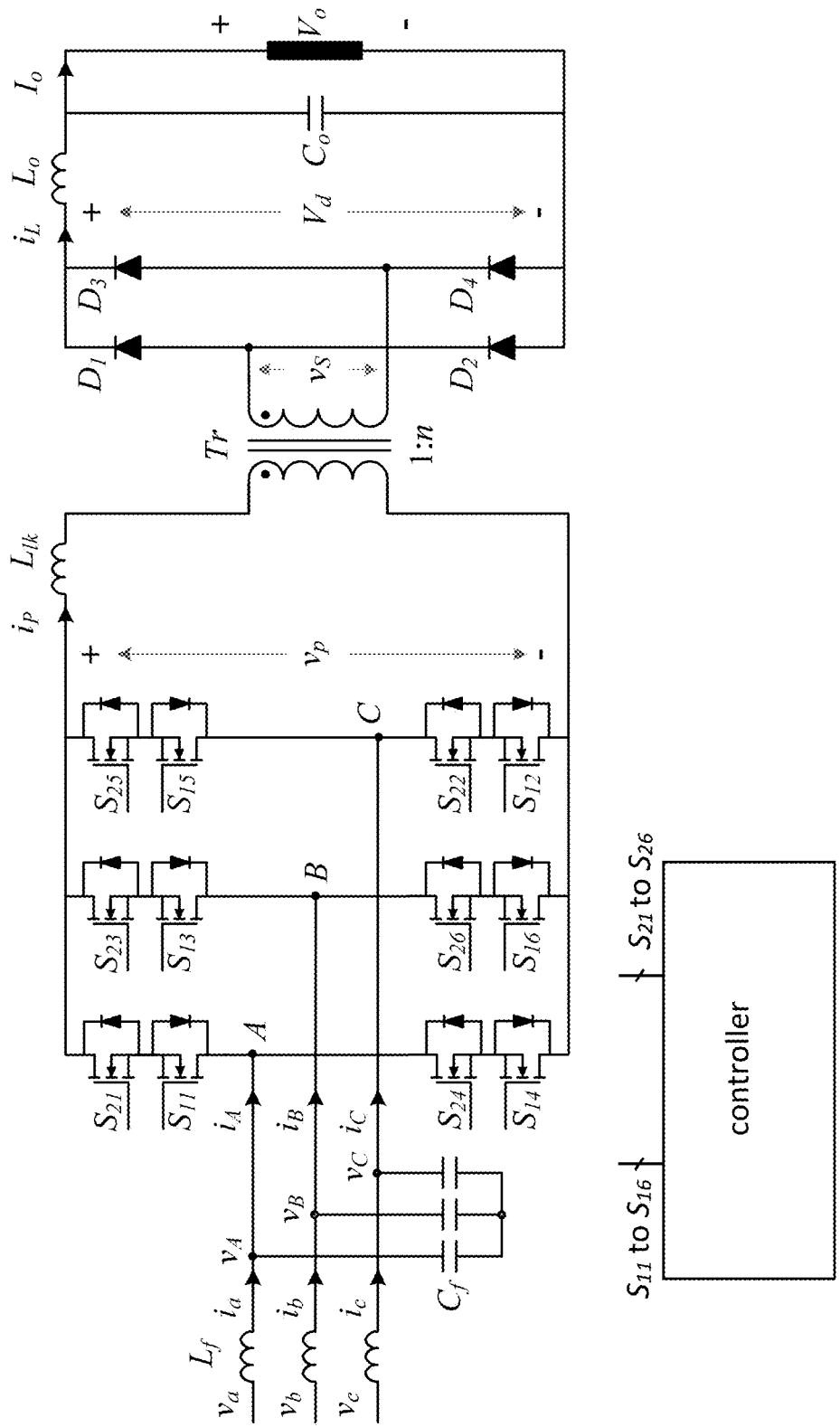
FIG. 1 illustrates a circuit diagram of an isolated matrix rectifier.

Preferred embodiments of the present invention will be described below with reference to the drawings.

It is to be noted that the following preferred embodiments represent examples of the present invention for merely illustrative purposes, and that the present invention is not limited to matters disclosed in the following preferred embodiments. The matters disclosed in the different preferred embodiments are able to be combined with each other in practical applications, and modified preferred embodiments in those cases are also included in the scope of the present invention. The drawings serve to assist understanding of the preferred embodiments, and they are not always exactly drawn in a strict sense. In some cases, for instance, dimension ratios between constituent elements themselves or dimension ratios of distances between elements or features, which are shown in the drawings, do not match with the dimension ratios described in the Description. Furthermore, some of the elements or features, which are explained in the Description, are omitted from the drawings, or they are shown in a reduced number on a case-by-case basis.

Preferred embodiments of the present invention improve operation of a matrix rectifier when one input phase is disconnected or is short circuited. If one input phase is disconnected, the switching scheme and control scheme operate the matrix rectifier to continuously deliver power to a load, as discussed below.

FIG. 1 is a circuit diagram that illustrates the topology of a 3-phase-to-1-phase matrix rectifier usable with the preferred embodiments of the present invention. However, the preferred embodiments of the present invention are not limited to the circuitry shown in FIG. 1, and other rectifiers and/or circuit topologies may be used.

The matrix rectifier shown in FIG. 1 includes a 3-phase-to-1-phase matrix converter that is connected a rectifier. In FIG. 1, "line side" or "primary side" refers to the portion of the circuit on the left-hand side of a transformer $T_r$ that is connected to line voltages $v_a$, $v_b$, $v_c$ for each of the three phases A, B, C, and "load side" or "secondary side" refers to the portion of the circuit on the right-hand side of the transformer $T_r$ that is connected to an output voltage $V_o$, i.e., the load. On the line side, the three-phase alternating current (AC) is combined into a single-phase AC current by the 3-phase-to-1-phase matrix converter, which includes bi-directional switch pairs $S_{11}$ to $S_{16}$ and $S_{21}$ to $S_{26}$. On the load side, the single-phase AC current is rectified by the rectifier, which includes diodes $D_1$ to $D_4$, to provide a DC current. A leakage inductance of the transformer $T_r$ is represented by $L_{lk}$ in FIG. 1.

The isolated matrix rectifier of FIG. 1 includes filter inductors $L_f$ and filter capacitors $C_f$ that define a line-side filter that reduces the total harmonic distortion (THD), the bi-directional switch pairs $S_{11}$ to $S_{16}$ and $S_{21}$ to $S_{26}$ arranged in a bridge as a 3-phase-to-1-phase matrix converter, the transformer $T_r$ that provides high-voltage isolation between the line-side circuit and the load-side circuit, the four diodes $D_1$ to $D_4$ arranged in a bridge to provide output rectification, and an output inductor $L_o$ and an output capacitor $C_o$ that define a load-side filter for the output voltage $V_o$. The bi-directional switch pairs $S_{11}$ to $S_{16}$ and $S_{21}$ to $S_{26}$ are arranged in pairs and are used in the isolated matrix rectifier of FIG. 1 to operate the current path. As shown in FIG. 1, the bi-directional switch pairs $S_{11}$ to $S_{16}$ and $S_{21}$ to $S_{26}$ include six pairs of uni-directional switches that are connected in parallel.

As shown in FIG. 1, the matrix rectifier preferably includes two stages: (1) a 3-phase-to-1-phase matrix converter, and (2) a diode rectifier. Alternatively, synchronous rectification, in which diodes are replaced with switches, can be used to achieve higher efficiency. The matrix converter and the diode rectifier are isolated by the high-frequency transformer $T_r$.

A controller of the matrix rectifier turns the bi-directional switch pairs $S_{11}$ to $S_{16}$ and $S_{21}$ to $S_{26}$ on and off to generate a desired voltage level for the output voltage $V_o$. A controller may be implemented by a microcontroller, processor, field-programmable gate array (FPGA), complex programmable logic device (CPLD), or the like.

Preferably, for example, a matrix rectifier that is used with the preferred embodiments of the present invention includes first, second, and third phases; and uni-directional switches $S_{ij}$, where i=1, 2 and j=1, 2, 3, 4, 5, 6 and where uni-directional switches $S_{1j}$ and $S_{2j}$ are connected together to define the six bi-directional switch pairs.

A first end of the first bi-directional switch pair $S_{11}$, $S_{21}$; a first end of the third bi-directional switch pair $S_{13}$, $S_{23}$; and a first end of the fifth bi-directional switch pair $S_{15}$, $S_{25}$ are connected together to provide a positive-voltage node. A first end of the second bi-directional switch pair $S_{12}$, $S_{22}$; a first end of the fourth bi-directional switch pair $S_{14}$, $S_{24}$; and a first end of the sixth bi-directional switch pair $S_{16}$, $S_{26}$ are connected together to provide a negative-voltage node. A second end of the first bi-directional switch pair $S_{11}$, $S_{21}$ and a second end of the fourth bi-directional switch pair $S_{14}$, $S_{24}$ are each connected to the first-phase voltage $v_a$. A second end of the third bi-directional switch pair $S_{13}$, $S_{23}$ and a second end of the sixth bi-directional switch pair $S_{16}$, $S_{26}$ are each connected to the second-phase voltage $v_b$. A second end of the fifth bi-directional switch pair $S_{15}$, $S_{25}$ and a second end of the second bi-directional switch pair $S_{12}$, $S_{22}$ are each connected to the third-phase voltage $v_c$.

Figure 2:
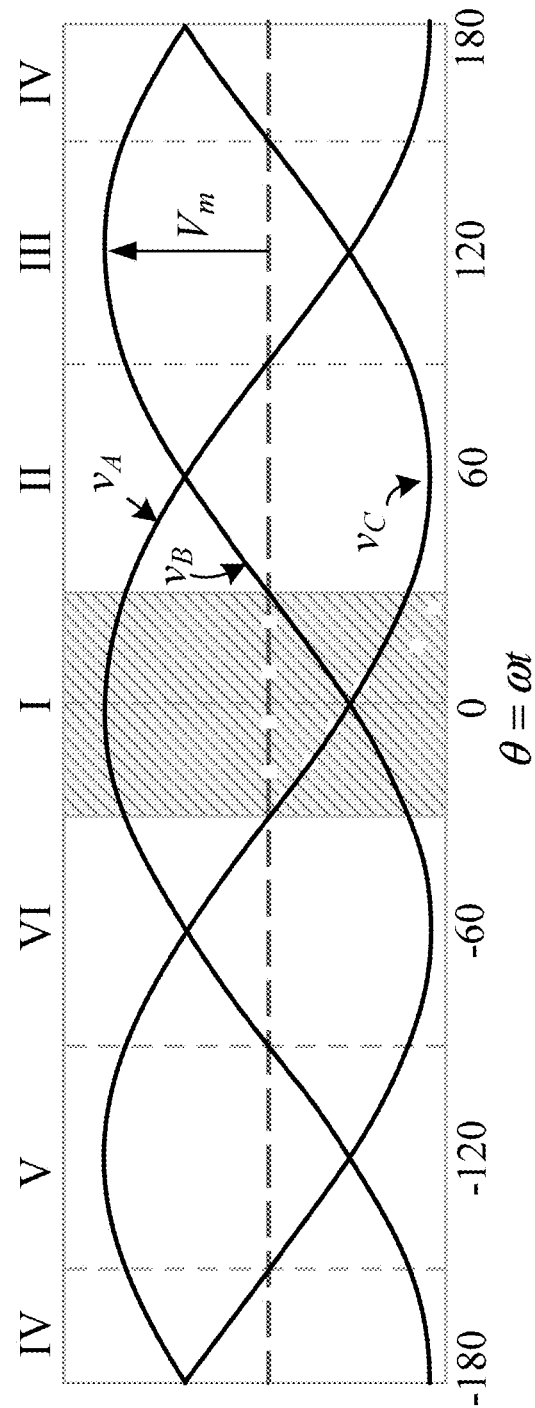
FIG. 2 illustrates waveforms of 3-phase input voltages of the matrix rectifier.

FIG. 2 illustrates waveforms of three input voltages phases of the matrix converter shown in FIG. 1. FIG. 2 shows the relative phases of the input voltages $v_A$, $v_B$, $v_C$ as divided into 60° intervals I to VI over time. The shaded portion I is centered about a phase angle θ=0 to ±30°. Each of the input voltages $v_A$, $v_B$, $v_C$ has the same maximum potential $V_m$.

As shown in FIG. 2, within any interval I to VI between two successive zero crossings of the input voltages $v_A$, $v_B$, $v_C$, two of the three voltages do not change polarity. For example, in the interval I (shaded area) with −30°<θ<30°, the line voltages $v_{AB}=v_A-v_B$ and $v_{AC}=v_A-v_C$ are positive, and both $v_{AB}$ and $v_{AB}$ attain their maximum value during this interval. Because the switching frequency of the matrix converter is much higher than the frequency of the input voltages $v_A$, $v_B$, $v_C$, the two line voltages $v_{AB}$, $v_{AC}$ can be treated as slowly varying DC voltages.

Figures 3A, 3B:
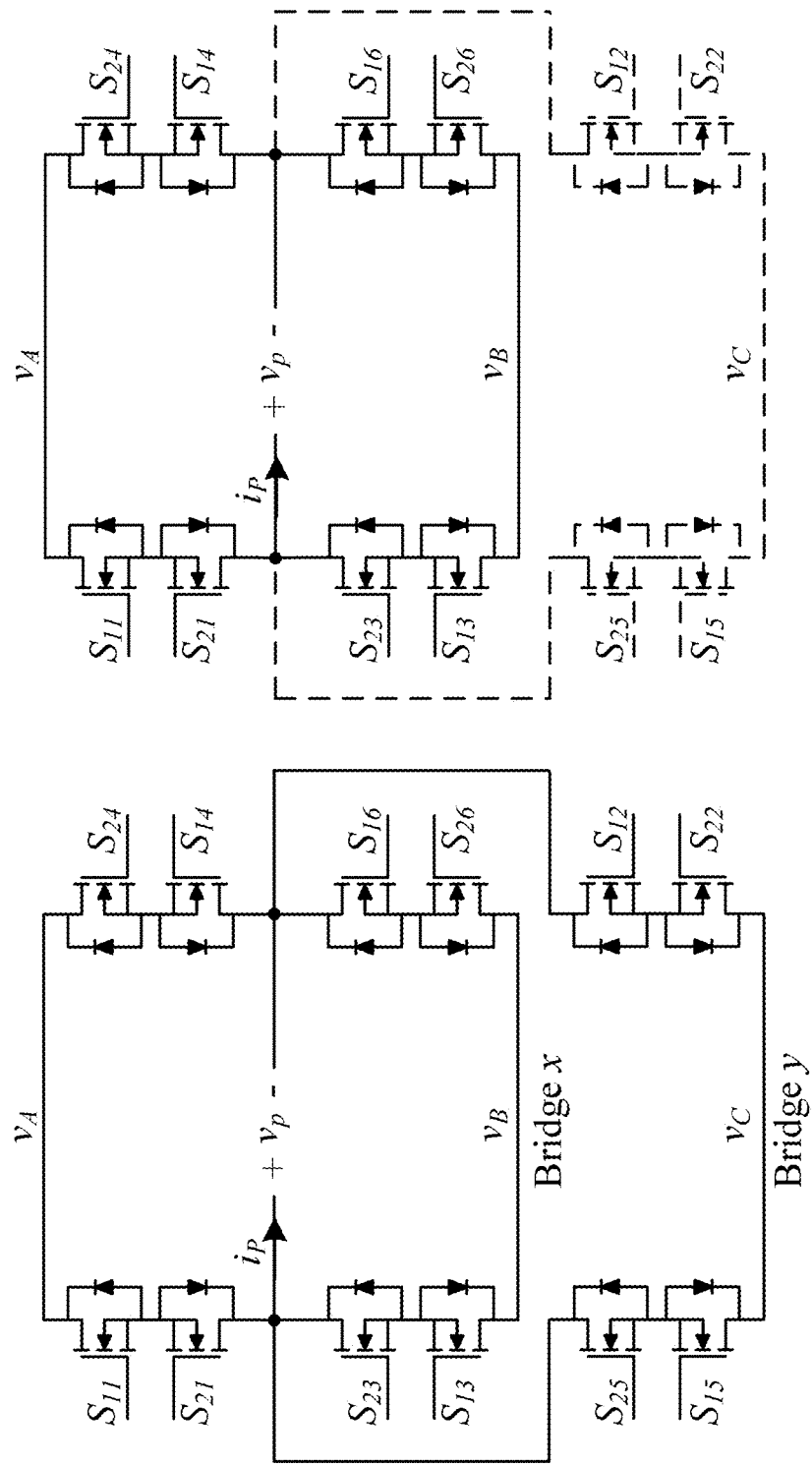
FIGS. 3A and 3B illustrate diagrams of a zero voltage switching full-bridge DC-DC converter.

Therefore, the matrix rectifier on the line side of FIG. 1 can be redrawn as an equivalent two full-bridge phase-shifted (FB-PS) converter as shown in FIG. 3A. FIG. 3A shows the various switch pairs connected to the input voltages $v_A$, $v_B$, $v_C$ and the voltage input nodes as shown in FIG. 1.

In each 60° interval I to IV shown in FIG. 2, the one of the 3-phases that has the highest or lowest voltage potential is shared by the "Bridge x" and "Bridge y." For example, in interval I, the phase A has the highest voltage potential $v_A$ and is the common in "Bridge x" and "Bridge y," as shown in FIG. 3A.

FIG. 3B illustrates an equivalent full-bridge FB-PS converter with phase C disconnected or short-circuited. In FIG. 3B, the dotted lines of the connections for the equivalent circuit of "Bridge y" indicate that phase C with input voltage $v_C$ is disconnected. Thus, the remaining equivalent circuit operates with "Bridge x" and input voltages $v_A$ and $v_B$, but not with input voltage $v_C$.

Figure 4A:
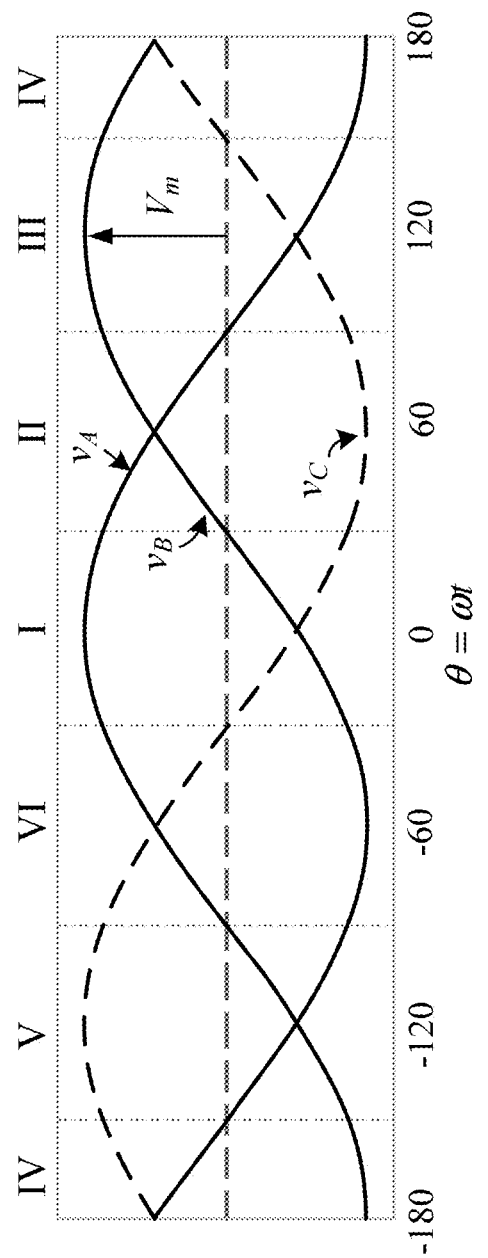
FIGS. 4A and 4B illustrate waveforms of the matrix converter with one phase disconnected or short-circuited.
Figure 4B:
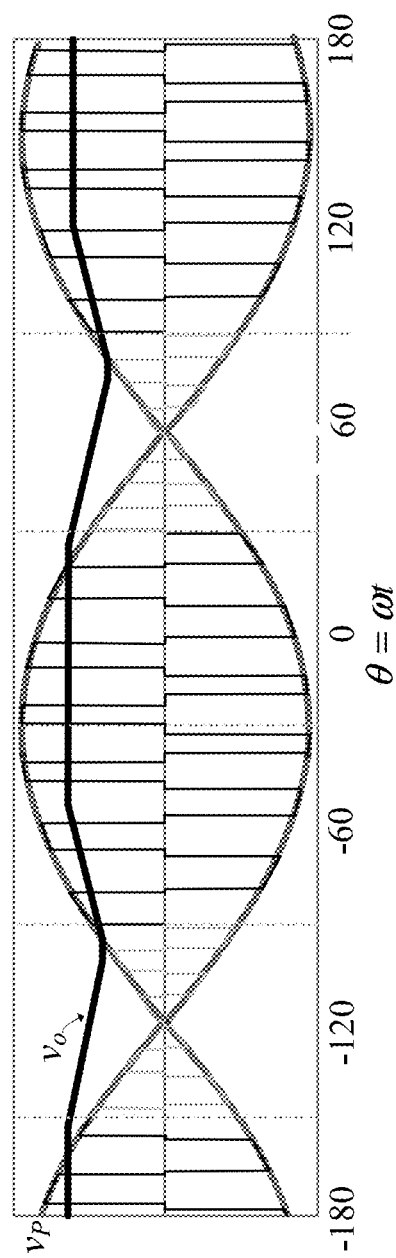

FIGS. 4A and 4B illustrate waveforms of the matrix converter with one phase disconnected or short-circuited. FIG. 4A shows waveforms similar to the waveforms shown in FIG. 2. However, in FIG. 4A, the dotted line of input phase C indicates that the input voltage $v_C$ is disconnected.

FIG. 4B shows waveforms within one input-line cycle including a greatly exaggerated switching period of pulse-width modulation (PWM) while one phase is disconnected or is short-circuited. The PWM switching frequency is much higher than the line frequency. One input-line cycle may contain tens or hundreds of PWM periods depending on the switching frequency. Therefore, the PWM waveform of $v_P$ cannot be clearly shown if the switching period is not greatly exaggerated in the figure. For each of the six intervals I-VI, only the switches connected to phase A and B are involved (for example, due to phase C with input voltage $v_c$ being disconnected or short-circuited), and the matrix converter operates similar to a single FB-PS converter.

Referring to FIG. 4B, a positive voltage pulse $v_P$ is generated by the controller turning on the bi-directional switch pairs $S_{11}$, $S_{21}$ and Sic, $S_{26}$ with equal on-time, creating a positive voltage pulse where $v_P=v_{AB}$ and a current pulse flowing from phase A into phase B with a magnitude of $I_P$. In order to keep the transformer $T_r$ flux balanced, a negative voltage pulse of a same duration as the positive voltage pulse is next generated by the controller turning on the bi-directional switch pairs $S_{14}$, $S_{24}$ and $S_{13}$, $S_{23}$. The line-side currents remain the same regardless of the alternating transformer current. While one phase is disconnected or is short circuited (for example, phase C with input voltage $v_c$), the output voltage $v_0$ decays down when input voltage $v_{AB}$ is lower than $v_0$ with respect to the transformer primary side, because the matrix converter is a buck-type converter. In the two intervals V and II, the transformer primary voltage is lower than $v_0$ with respect to the transformer primary side, and no power is delivered to the secondary side. Therefore, modulation of the matrix converter is able to be stopped to reduce gating losses and other losses.

Figure 5B:
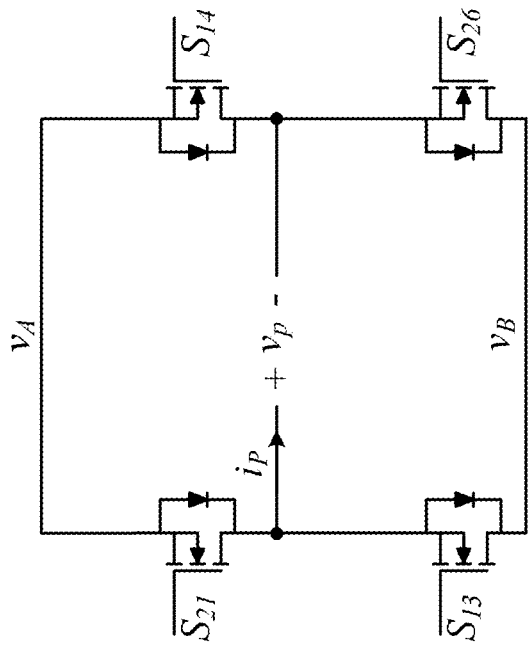
FIGS. 5A and 5B illustrate equivalent circuit diagrams of the matrix converter with one phase disconnected or short-circuited during different phase intervals.
Figure 5A:
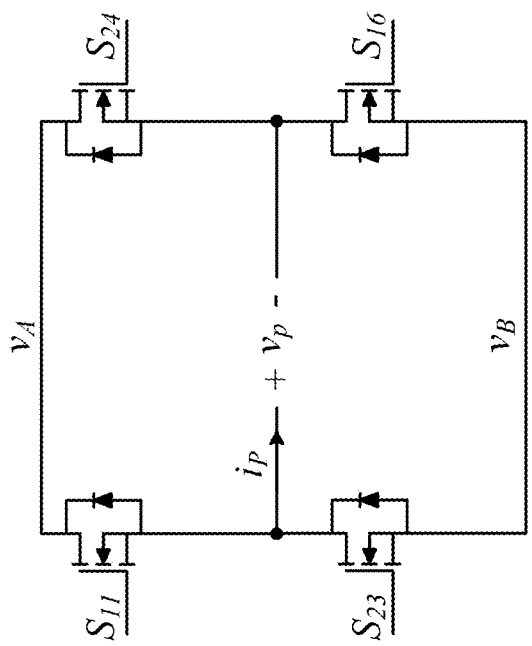

FIGS. 5A and 5B illustrate equivalent circuit diagrams of the matrix converter with phase C disconnected or short-circuited. Within every 60° phase interval, the three-phase converter is operated as a FB-PS converter as shown in FIGS. 5A and 5B, assuming phase C is disconnected or is short-circuited.

FIG. 5A shows an equivalent circuit of the three-phase converter during the interval of −120°<θ<60° when $v_{AB}$ is positive in FIG. 2, i.e., when voltage $v_A$>voltage $v_B$. FIG. 5B shows an equivalent circuit during the interval of 60°<θ<−120° when $v_{AB}$ is negative in FIG. 2, i.e., when voltage $v_A$<voltage $v_B$.

When one input voltage is not available, only four of the six bi-directional switch pairs (i.e., eight of the twelve uni-switches) are involved, and the switches connected to the missing input phase C are not operated. As shown in FIG. 5A, the uni-directional switches $S_{11}$, $S_{24}$, $S_{23}$, $S_{16}$ are operated during the phase interval −120°<θ<60°. As shown in FIG. 5B, the uni-directional switches $S_{21}$, $S_{14}$, $S_{13}$, $S_{26}$ are operated during the interval 60°<θ<−120°.

For ZVS switching, the uni-directional switches of each of the bi-directional switch pairs $S_{11}$ to $S_{16}$ and $S_{21}$ to $S_{26}$ are preferably metal-oxide-semiconductor field-effect transistors (MOSFETs), for example. Accordingly, some of the bi-directional switch pairs $S_{11}$ to $S_{16}$ and $S_{21}$ to $S_{26}$ are operated to generate both positive and negative pulses for transformer Tr, and others of the bi-directional switch pairs $S_{11}$ to $S_{16}$ and $S_{21}$ to $S_{26}$ are operated as synchronous rectification switches to reduce conduction losses.

Figures 6A, 6B:
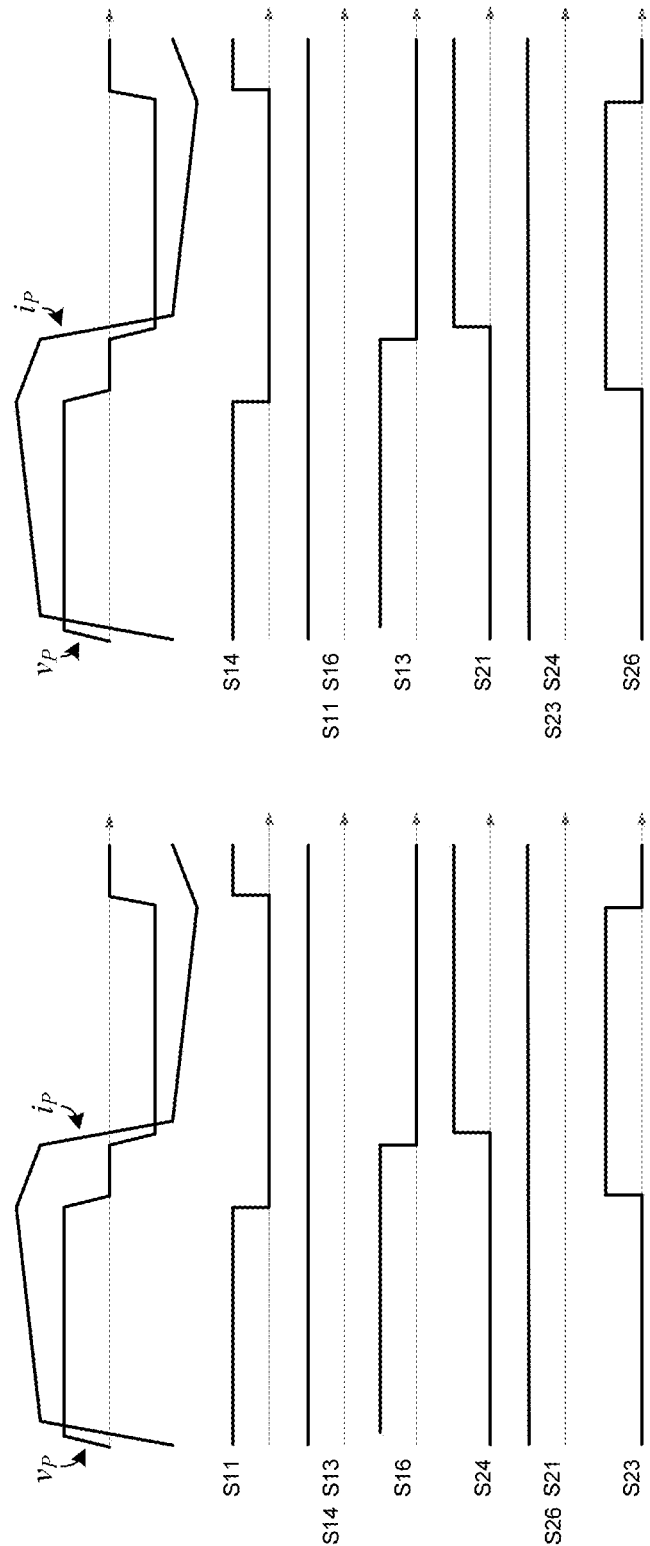
FIGS. 6A and 6B illustrate switch gate signals during a switching period.

For example, during the interval −120°<θ<60° in FIG. 5A, voltage $v_A$>voltage $v_B$; therefore, the uni-directional switches $S_{14}$, $S_{21}$, $S_{13}$ and $S_{26}$ of the equivalent bridge are used for synchronous rectification and can be kept on during the interval because the body diodes of these switches are forward biased. The remaining four uni-directional switches $S_{11}$, $S_{24}$, $S_{23}$, $S_{16}$ operate similar to a FB-PS converter during this interval. FIG. 6A illustrates the corresponding switch gate signals of the uni-directional switches $S_{11}$, $S_{13}$, $S_{14}$, $S_{16}$, $S_{21}$, $S_{23}$, $S_{24}$, $S_{26}$ during one switching period $T_S$ for the interval $-120°<\theta<60°$. In the bridge circuit shown in FIG. 5A, the uni-directional switch $S_{24}$ is complementary to the uni-directional switch $S_{16}$ in the right-side circuit, and the uni-directional switch $S_{11}$ is complementary to the uni-directional switch $S_{23}$ in the left-side circuit in order to prevent a short circuit between voltage $v_A$ and voltage $v_B$.

As another example, during the interval $60°<\theta<-120°$, voltage $v_A<$voltage $v_B$. Thus, the uni-directional switches $S_{23}$, $S_{16}$, $S_{11}$, and $S_{24}$ can be kept on during the interval because the body diodes of these switches are forward biased, as shown in FIG. 5B. The remaining four uni-directional switches $S_{11}$, $S_{24}$, $S_{23}$, $S_{16}$ operate similar to a FB-PS converter during this interval. As described above, FIG. 6B illustrates the corresponding switch gate signals of the uni-directional switches $S_{11}$, $S_{13}$, $S_{14}$, $S_{16}$, $S_{21}$, $S_{23}$, $S_{24}$, $S_{26}$ during one switching period $T_S$ for the interval of $60°<\theta<-120°$. In the bridge circuit shown in FIG. 5B, the uni-directional switch $S_{14}$ is complementary to the uni-directional switch $S_{26}$ in the right-side circuit and the uni-directional switch $S_{21}$ is complementary to the uni-directional switch $S_{13}$ in the left-side circuit in order to prevent a short circuit between $v_A$ and $v_B$.

Figure 7:
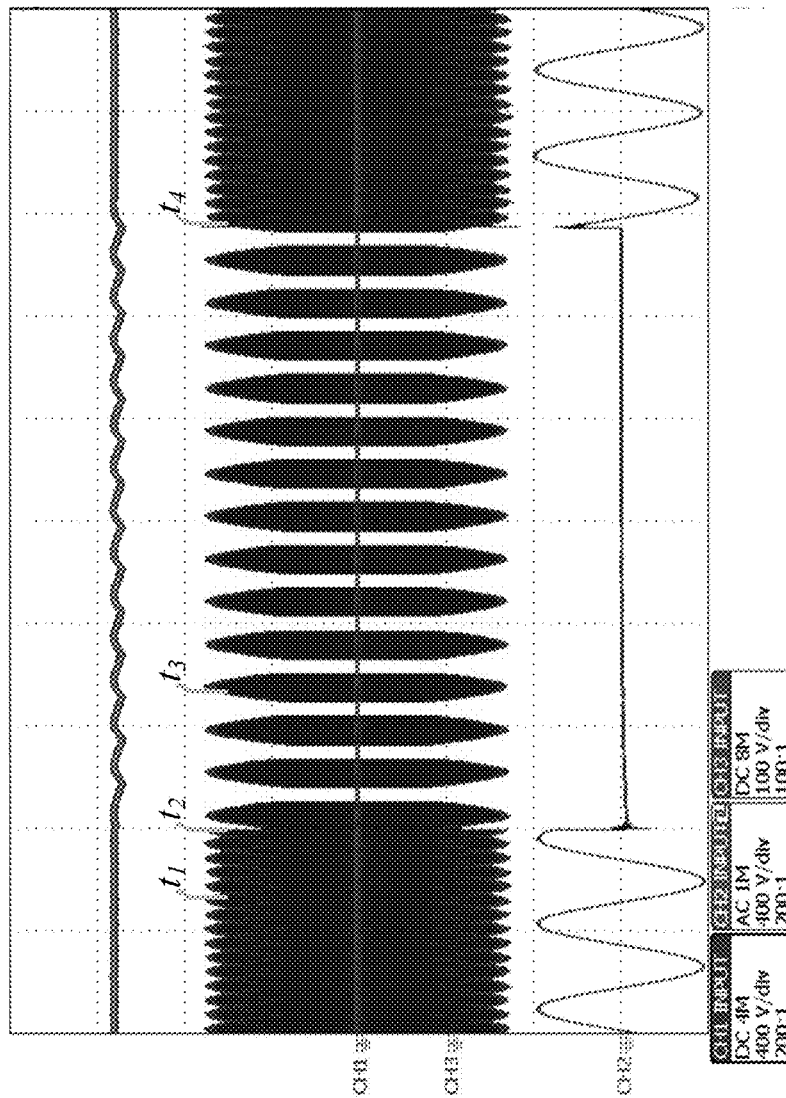
FIG. 7 illustrates a diagram of exemplary waveforms of the matrix rectifier with one phase short-circuited.

FIG. 7 shows exemplary waveforms of a matrix rectifier representative of a preferred embodiment of the present invention. FIG. 7 shows waveforms when input voltage $v_C$ is short-circuited. From the top to bottom, the waveforms are output voltage $V_o$ (channel 3), transformer primary voltage (channel 1), and input voltage $v_C$ (channel 2). At time $t_1$, the matrix rectifier operates in normal operation mode. At time $t_2$, when input voltage $v_C$ drops to zero, the matrix rectifier switches to fault operation mode as described above, and the output voltage $V_o$ is still regulated. At time $t_4$, the input voltage $v_C$ recovers, and the matrix rectifier switches back to normal operation mode. During the interval when the input voltage $v_C$ is zero because of being short-circuited, the matrix rectifier is able to maintain the output voltage $V_o$ and deliver power to the output.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply circuit comprising:
   a matrix converter that converts a first input alternating current (AC) phase, a second input AC phase, and a third AC input phase into a single primary phase;
   a transformer including a primary side electrically connected to the single primary phase;
   a rectifier electrically connected to a secondary side of the transformer; and
   an output voltage terminal electrically connected to the rectifier; wherein
   the matrix converter includes first through sixth bi-directional switch pairs;
   each of the first through sixth bi-directional switch pairs includes a first uni-directional switch and a second uni-directional switch;
   a first end of the first bi-directional switch pair, a first end of the third bi-directional switch pair, and a first end of the fifth bi-directional switch pair are connected together to provide a positive-voltage node;
   a first end of the second bi-directional switch pair, a first end of the fourth bi-directional switch pair, and a first end of the sixth bi-directional switch pair are connected together to provide a negative-voltage node;
   a second end of the first bi-directional switch pair and a second end of the fourth bi-directional switch pair are each connected to the first input AC phase;
   a second end of the third bi-directional switch pair and a second end of the sixth bi-directional switch pair are each connected to the second input AC phase;
   a second end of the fifth bi-directional switch pair and a second end of the second bi-directional switch pair are each connected to the third input AC phase; and
   when the third input AC phase is disconnected or short circuited:
      the second and the fifth bi-directional switch pairs are turned off;
      in each of the first, third, fourth, and sixth bi-directional switch pairs:
         one of the first and second uni-directional switches are turned on, and
         the other of the second and first uni-directional switches are operated as a full-bridge phase-shifted converter.

2. The power supply circuit according to claim 1, wherein the first and second uni-directional switches of each of the first through sixth bi-directional switch pairs are electrically connected in series with each other.

3. The power supply circuit according to claim 2, wherein the first and second uni-directional switches of each of the first through sixth bi-directional switch pairs are metal-oxide-semiconductor field-effect transistors.

4. The power supply circuit according to claim 1, wherein:
   the first bi-directional switch pair and the sixth bi-directional switch pair are turned on with a same first on-time duration; and
   the third bi-directional switch pair and the fourth bi-directional switch pair are turned on with a same second on-time duration.

5. The power supply circuit according to claim 1, wherein:
   during an interval when the first input AC phase is greater than the second input AC phase:
      the first uni-directional switch of the first bi-directional switch pair and the second uni-directional switch of the third bi-directional switch pair operate as complementary switches; and
      the second uni-directional switch of the fourth bi-directional switch pair and the first uni-directional switch of the sixth bi-directional switch pair operate as complementary switches.

6. The power supply circuit according to claim 1, wherein during an interval when the first input AC phase is greater than the second input AC phase, the second uni-directional switch of the first bi-directional switch pair, the first uni-directional switch of the third bi-directional switch pair, the first uni-directional switch of the fourth bi-directional switch pair, and the second uni-directional switch of the sixth bi-directional switch pair are all turned on.

7. The power supply circuit according to claim 1, wherein during an interval when the first input AC phase is greater than the second input AC phase, the second uni-directional switch of the first bi-directional switch pair, the first uni-directional switch of the third bi-directional switch pair, the first uni-directional switch of the fourth bi-directional switch pair, and the second uni-directional switch of the sixth bi-directional switch pair are controlled to provide synchronous rectification.

8. The power supply circuit according to claim 1, wherein:
during an interval when the first input AC phase is less than the second input AC phase:
the second uni-directional switch of the first bi-directional switch pair and the first uni-directional switch of the third bi-directional switch pair operate as complementary switches; and
the first uni-directional switch of the fourth bi-directional switch pair and the second uni-directional switch of the sixth bi-directional switch pair operate as complementary switches.

9. The power supply circuit according to claim 1, wherein during an interval when the first input AC phase is less than the second input AC phase, the first uni-directional switch of the first bi-directional switch pair, the second uni-directional switch of the third bi-directional switch pair, the second uni-directional switch of the fourth bi-directional switch pair, and the first uni-directional switch of the sixth bi-directional switch pair are all turned on.

10. The power supply circuit according to claim 1, wherein during an interval when the first input AC phase is less than the second input AC phase, the first uni-directional switch of the first bi-directional switch pair, the second uni-directional switch of the third bi-directional switch pair, the second uni-directional switch of the fourth bi-directional switch pair, and the first uni-directional switch of the sixth bi-directional switch pair are controlled to provide synchronous rectification.

11. The power supply circuit according to claim 1, wherein the first through sixth bi-directional switch pairs are turned on and off to regulate an output voltage level of the output voltage terminal.

12. The power supply circuit according to claim 9, further comprising a controller that is a microcontroller, a processor, field-programmable gate array, or a complex programmable logic device.

13. The power supply circuit according to claim 1, wherein the matrix converter is a buck-type converter.

14. The power supply circuit according to claim 1, wherein the rectifier includes four diodes arranged in a bridge.

15. The power supply circuit according to claim 1, further comprising an output filter electrically connected to an output of the rectifier.

16. The power supply circuit according to claim 15, wherein the output filter includes an output inductor and an output capacitor.

17. The power supply circuit according to claim 1, further comprising an input filter electrically connected to each of the first, second, and third input AC phases.

* * * * *